(12) United States Patent
McNary

(10) Patent No.: US 7,486,883 B2
(45) Date of Patent: Feb. 3, 2009

(54) RADIO REMOTE CONTROL FOR PHOTOGRAPHIC EQUIPMENT

(75) Inventor: Wade McNary, Miami Beach, FL (US)

(73) Assignee: Tamrac, Inc., Chatsworth, CA (US)

( * ) Notice: Subject to any disclaimer, the term of this patent is extended or adjusted under 35 U.S.C. 154(b) by 534 days.

(21) Appl. No.: 11/143,008

(22) Filed: Jun. 1, 2005

(65) Prior Publication Data

US 2006/0275024 A1     Dec. 7, 2006

(51) Int. Cl.
    *G03B 17/18* (2006.01)
(52) U.S. Cl. .................. 396/56; 348/211.2; 348/734
(58) Field of Classification Search ............. 396/56–59, 396/263, 429, 661; 348/14.02, 14.05, 114, 348/211.2, 211.3, 211.4, 211.11, 211.99, 348/725, 734
    See application file for complete search history.

(56) References Cited

U.S. PATENT DOCUMENTS

| | | | | |
|---|---|---|---|---|
| 5,283,610 A | * | 2/1994 | Sasaki | .................. 396/57 |
| 5,359,375 A | * | 10/1994 | Clark | .................. 396/56 |
| 6,809,759 B1 | * | 10/2004 | Chiang | .................. 348/211.2 |
| 2002/0009296 A1 | * | 1/2002 | Shaper et al. | .................. 396/56 |
| 2004/0008265 A1 | * | 1/2004 | Pedigo et al. | .................. 348/211.2 |
| 2004/0101295 A1 | * | 5/2004 | Clark | .................. 396/56 |
| 2004/0106377 A1 | * | 6/2004 | Van Der Winkel et al. | . 455/41.2 |
| 2004/0156627 A1 | * | 8/2004 | Lin et al. | .................. 396/56 |
| 2005/0012823 A1 | * | 1/2005 | Young | .................. 348/211.2 |
| 2005/0249486 A1 | * | 11/2005 | Murray | .................. 396/56 |

\* cited by examiner

*Primary Examiner*—Melissa J Koval
*Assistant Examiner*—Fang-Chi Chang
(74) *Attorney, Agent, or Firm*—Thomas I. Rozsa

(57) ABSTRACT

A radio sync system for photographic equipment including a transmitter unit and a receiver unit. The transmitter unit utilizes a power-management scheme for keeping the transmitter unit in a low-power stand-by state except when an RF signal needs to be transmitted, and returning the transmitter unit back into the low-power stand-by state within a pre-defined short period of time after transmitting the RF signal. The receiver unit utilizes a power-sensing scheme for keeping the receiver unit in a low-power stand-by state when it is not connected to a remote photographic equipment or the remote photographic equipment is powered off but turning the receiver unit on when it is connected to a remote photographic equipment and the remote photographic equipment is powered on such that when an RF signal is received, the receiver unit can send a command signal to operate the remote photographic equipment.

10 Claims, 6 Drawing Sheets

RADIO REMOTE CONTROL FOR PHOTOGRAPHIC EQUIPMENT

BACKGROUND OF THE INVENTION

1. Field of the Invention

The present invention relates to the fields of photographic equipment and particularly radio transmitters and receivers for photographic equipment.

2. Description of the Prior Art

Radio transmitters and receivers have been used for photographic equipment, including those specifically designed transmitters and receivers that allow users to trigger photographic strobe lighting remotely.

Professional photographers often use a momentary flash form strobe lighting to illuminate their subjects. One of the requirements for a flash is that it must occur precisely when the camera shutter is open, i.e., be "synchronized" with the shutter.

The most common method for synchronizing a strobe to the shutter is a sync cable which electrically connects an output signal from a camera to an input port of the strobe unit. An alternative sync method is to use a wireless arrangement for transmitting the camera's output signal to the strobe.

Most wireless arrangements utilize infrared (IR) and radio transmissions. Wireless syncs provide advantages in convenience, freedom of mobility, as well as electrical separation between the camera's sensitive circuitry and the potential high voltage of the strobe that could discharge through the sync cable into the camera's circuitry. Radio syncs have advantages over IR, specifically in longer range transmission, the ability to penetrate through objects (such as building walls), and increased outdoor reliability.

All existing radio syncs (also called radio slaves) function by switching the transmitter (TX) and receiver (RX) to a powered state. Then the TX, upon sensing a signal from the camera, transmits a radio signal to the RX, which then signals the strobe to flash. One of the disadvantages of the existing TXs and RXs is that they are large in size and weight which require large, strong and separate hardware to mount the TX to the camera or the RX to the strobe. Another disadvantage of the existing TXs and RXs are that they are frequently left on which causes the batteries to die quickly.

Therefore it is desirable to provide a new and improved radio remote control device for photographic equipment that can reduce the consumption of battery power and therefore only need smaller and more compact batteries which reduces the size and weight of the device so smaller, lighter and less robust mounting hardware can be used to mount the device on the camera and strobe.

SUMMARY OF THE INVENTION

The present invention is directed to a radio transmitter and receiver system for photographic equipment for triggering photographic strobe lighting remotely.

One object of the present invention is to provide an improved radio sync that includes a transmitter (TX) unit and a receiver (RX) unit. The TX is provided with a power-management circuit which allows it to sense an input signal from a camera while in a sleep mode. When the TX senses the signal from the camera, it switches itself on, transmits the radio signal to an RX (to trigger a strobe flash), and immediately returns to the sleep mode.

The advantage of the power-management circuit is that it allows the TX to consume much less power, eliminate a power switch and external power jack, and reduce the size of the batteries. This greatly simplifies and reduces the size of the product. The advantage of reducing the size of the TX is that it is less obtrusive for the user, and requires lighter, less robust mounting hardware to mount the TX on the camera's hotshoe. Since it automatically returns to a sleep mode, it makes it impossible for the batteries in the TX to die because it is left on by the user.

The improved radio sync also provides a power-management circuit in the RX that allows it to sense whether it is plugged into a strobe's input jack, and whether the strobe is switched on.

The advantage of this power-management circuit is that it also allows the RX to consume much less power, eliminate the power switch and external power jack, and therefore, simplify and reduce the size of the RX.

The advantage of reducing the reduced size of the RX is that it is less obtrusive for the user, and requires lighter, less robust mounting hardware, such as the sync plug itself to mount the RX on the strobe. Since it automatically switched off when it is unplugged or the strobe is switched off, it conserves battery life and makes it impossible for the battery to die because the user put the RX away while it is still switched on.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described generally, the present invention is a radio sync system to be used between local and remote photographic equipment. The radio sync system includes a transmitter unit and a receiver unit.

The transmitter unit has a hotfoot for connection with a local photographic equipment and a housing for containing its internal electronics including a microprocessor, an input signal detector, a radio frequency (RF) transmitter and a transmitter antenna.

The transmitter unit utilizes a power-management means that keeps the transmitter unit in a low-power stand-by state, that powers up the transmitter unit when an input signal from the local photographic equipment is detected by the input signal detector for transmitting an RF signal to the receiver unit, and that returns the transmitter unit back into the low-power stand-by state within 1.5 milliseconds after transmitting the RF signal.

The receiver unit has a plug for connection with a remote photographic equipment and a housing for containing its internal electronics including a microprocessor, a command signal generator, a radio frequency (RF) receiver and a receiver antenna.

The receiver unit utilizes a power-sensing scheme that keeps the receiver unit in a low-power stand-by state when it is not connected to the remote photographic equipment or the remote photographic equipment is powered off, and that only powers up the receiver unit when it is connected to the remote photographic equipment and the remote photographic equipment is powered on such that when the receiver receives the RF signal, a command signal can be generated by the command generator and sent to the remote photographic equipment through the connector to operate the remote photographic equipment.

Figure 1:
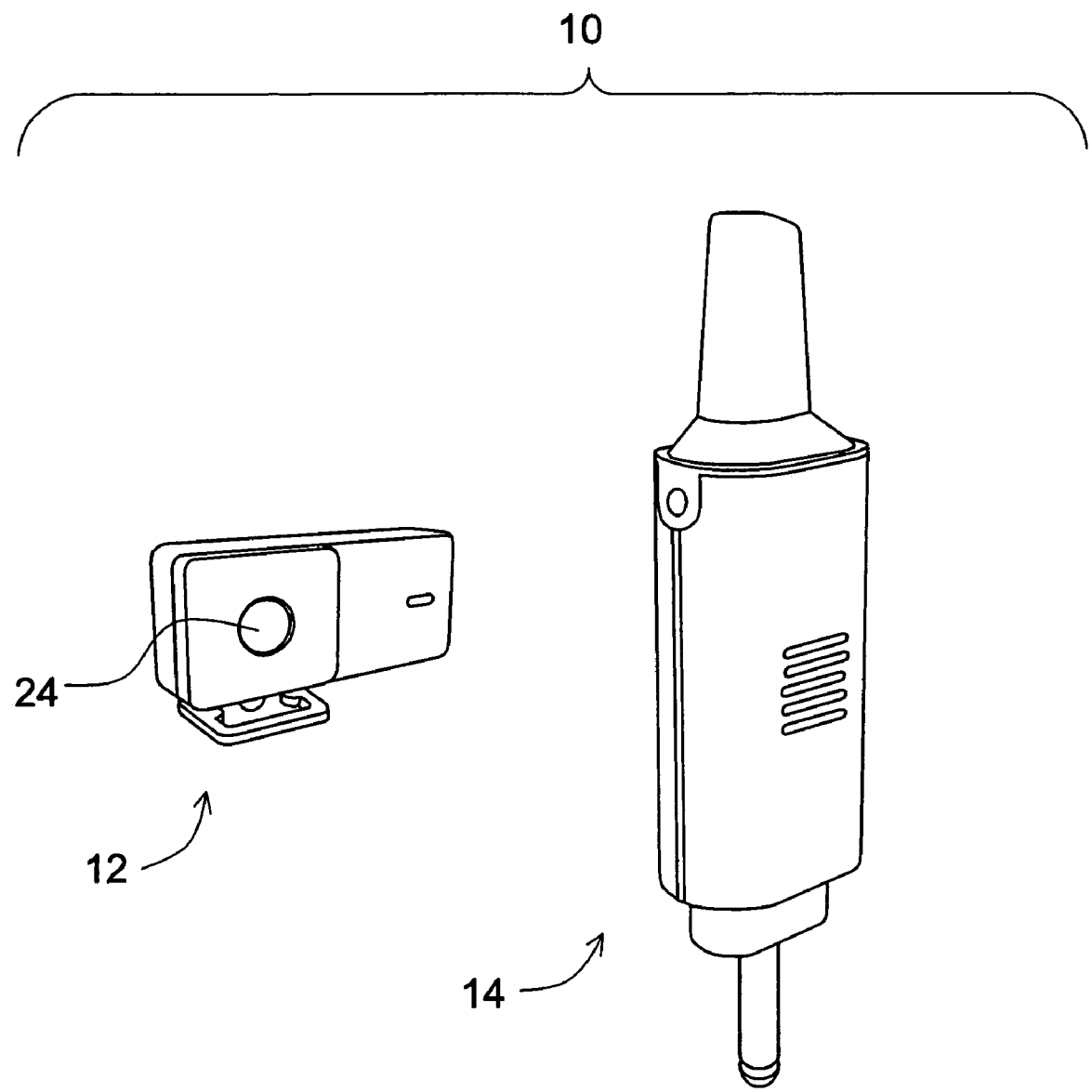
FIG. 1 is a perspective view diagram illustrating a preferred embodiment of the present invention radio sync device for photographic equipment, including a transmitter unit and a receiver unit.

Referring to FIG. 1, there is shown a radio sync system 10 for photographic equipment such as a camera (not shown) for triggering photographic strobe lighting (not shown) remotely. The present invention radio sync system 10 includes a transmitter (TX) 12 that can be attached to a camera (not shown) and a receiver (RX) 14 that can be attached to a strobe (not shown).

Figure 2:
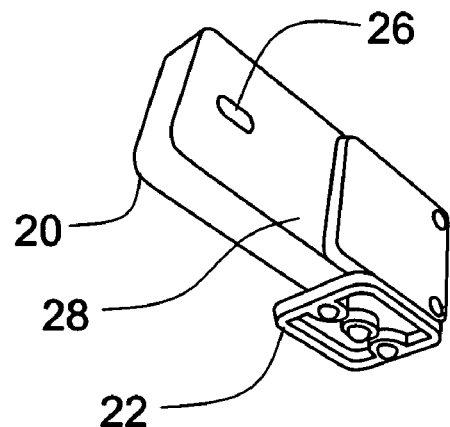
FIG. 2 is a perspective view diagram illustrating the transmitter unit of the present invention radio sync device for photographic equipment.
Figure 3:
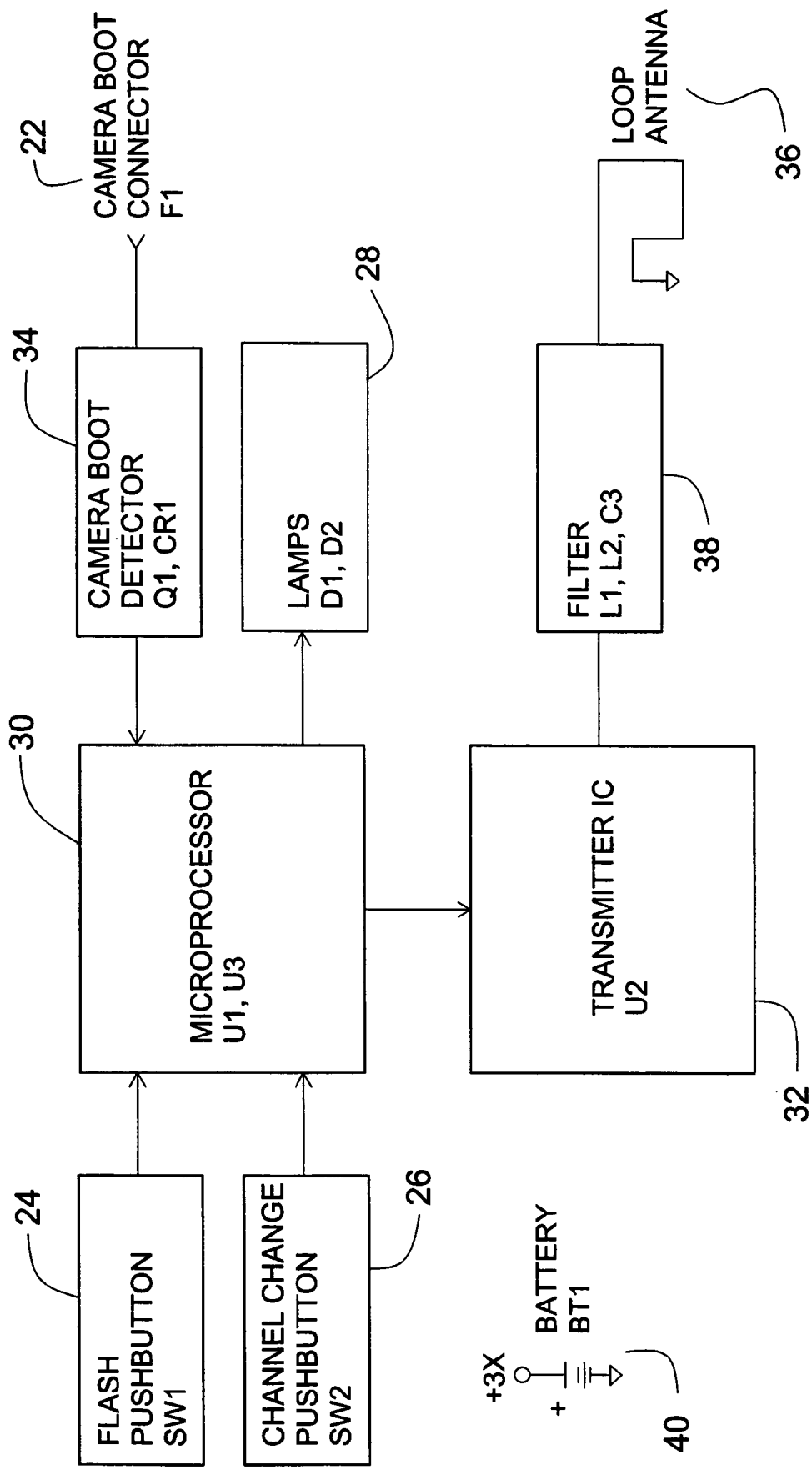
FIG. 3 is a block schematic diagram illustrating the component parts of the transmitter unit of the present invention radio sync device for photographic equipment.
Figure 4:
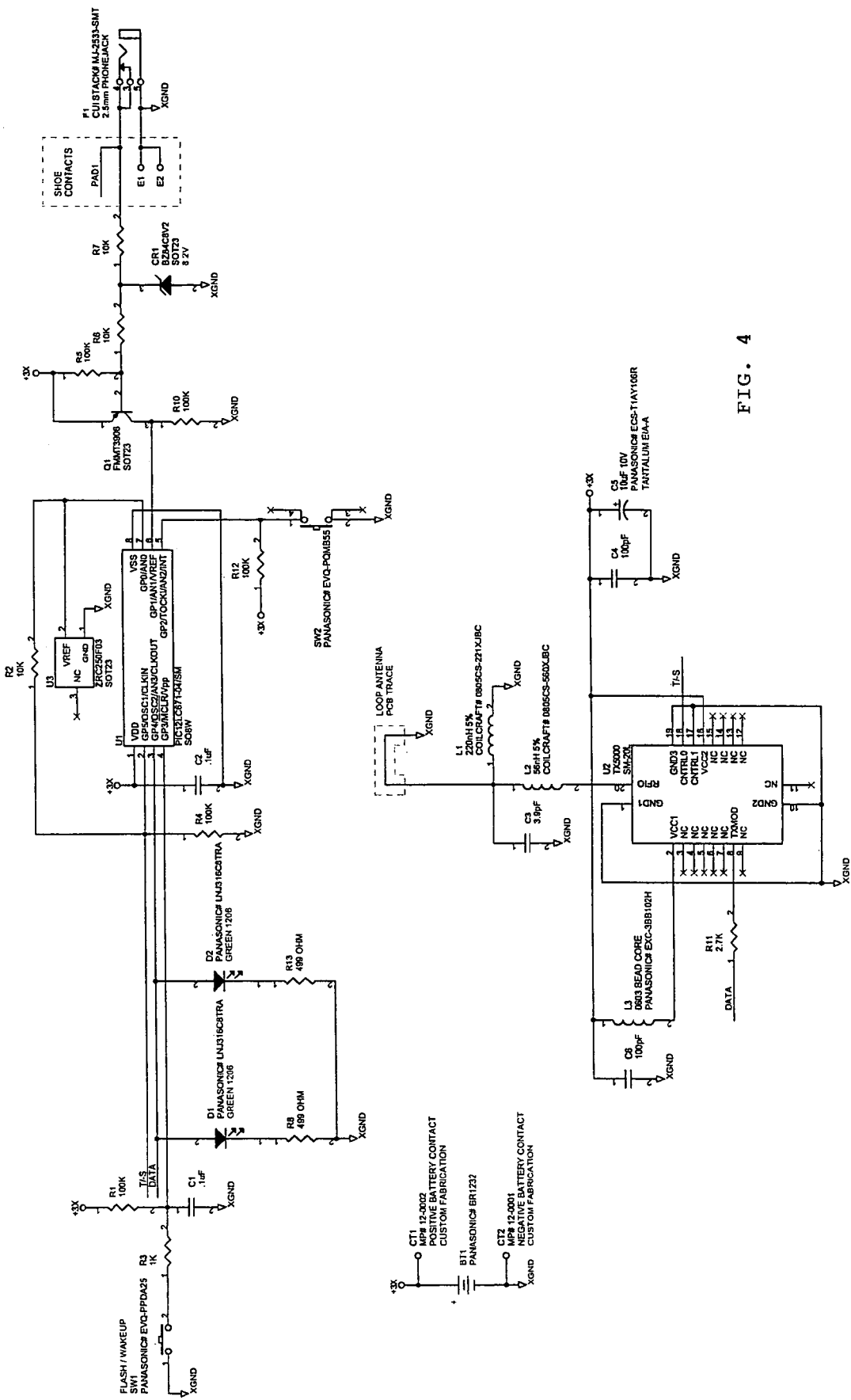
FIG. 4 is a detailed schematic diagram illustrating the circuitry of the internal electronics of the transmitter unit of the present invention radio sync device for photographic equipment.

Referring to FIGS. 2, 3 and 4, the transmitter 12 of the present invention radio sync for photographic equipment has a housing 20 for containing its internal electronics, battery and antenna, and a camera boot connector 22 for connection with a camera (not shown).

The internal electronics of the TX 12 include a microprocessor 30 and an RF transmitter 32. The microprocessor 30 receives signal from a camera boot detector 34 and also from a flash pushbutton switch 24 and a change-channel switch/pushbutton 26. The status of the TX 12 is indicated by a light emitting diode (LED) 28. The RF transmitter 32 sends signal to a loop antenna 36 through a filter 38.

The power of the TX 12 is provided by a battery 40. The electronic components of TX 12 are programmed to implement a power-management scheme such that the hardware of TX 12 is normally asleep, which means all the electronics are in a power-down mode. The electrical current consumption in this state is so low (e.g., a few micro amps) that no power switch is required to get long battery life. Typically the battery has about 230 mA-Hr capacity, which is enough for the TX 12 to maintain the sleep mode for 50 to 100 thousand hours.

When an input signal is detected from the flash pushbutton switch 24, the change channel switch 26, or the camera boot connector 22, the microprocessor 30 is interrupted and the sleep mode is terminated. The microprocessor 30 then proceeds to enable the RF transmitter 32 which transmits the desired code, and then goes back to sleep. This transmission process takes about 1.2 milliseconds.

If the flash pushbutton 24 is held down, the microprocessor remains awake and continues to transmit the flash signal every 100 milliseconds until the flash pushbutton switch 24 is released. This allows a user to manually trigger the flash. However, if a signal is received from the camera boot connector 22 or the channel change button 26 is pushed, only the input change of state wakes the microprocessor 30, and as soon as the operation is done, the TX unit goes back into the low-power sleep mode.

The channel change button 26 can be pushed by the user to select between 4 codes the transmitter can transmit. This allows the user, or multiple users, to have simultaneous use of radio strobe controls without interference. Each time the channel change pushbutton 26 is pressed, the TX 12 increments to the next code and transmits a special channel change character to the RX 14. The LED 28 will flash 1 to 4 times to indicate the channel selected.

Figure 5:
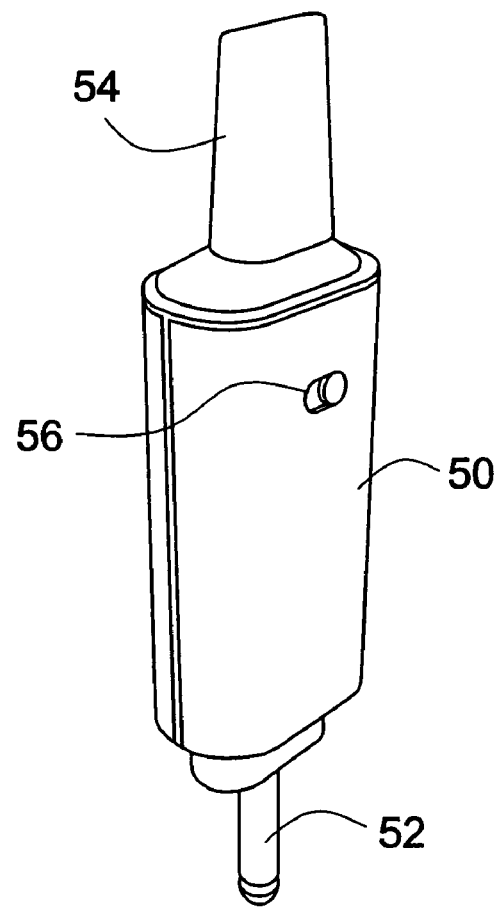
FIG. 5 is a perspective view diagram illustrating the receiver unit of the present invention radio sync device for photographic equipment.
Figure 6:
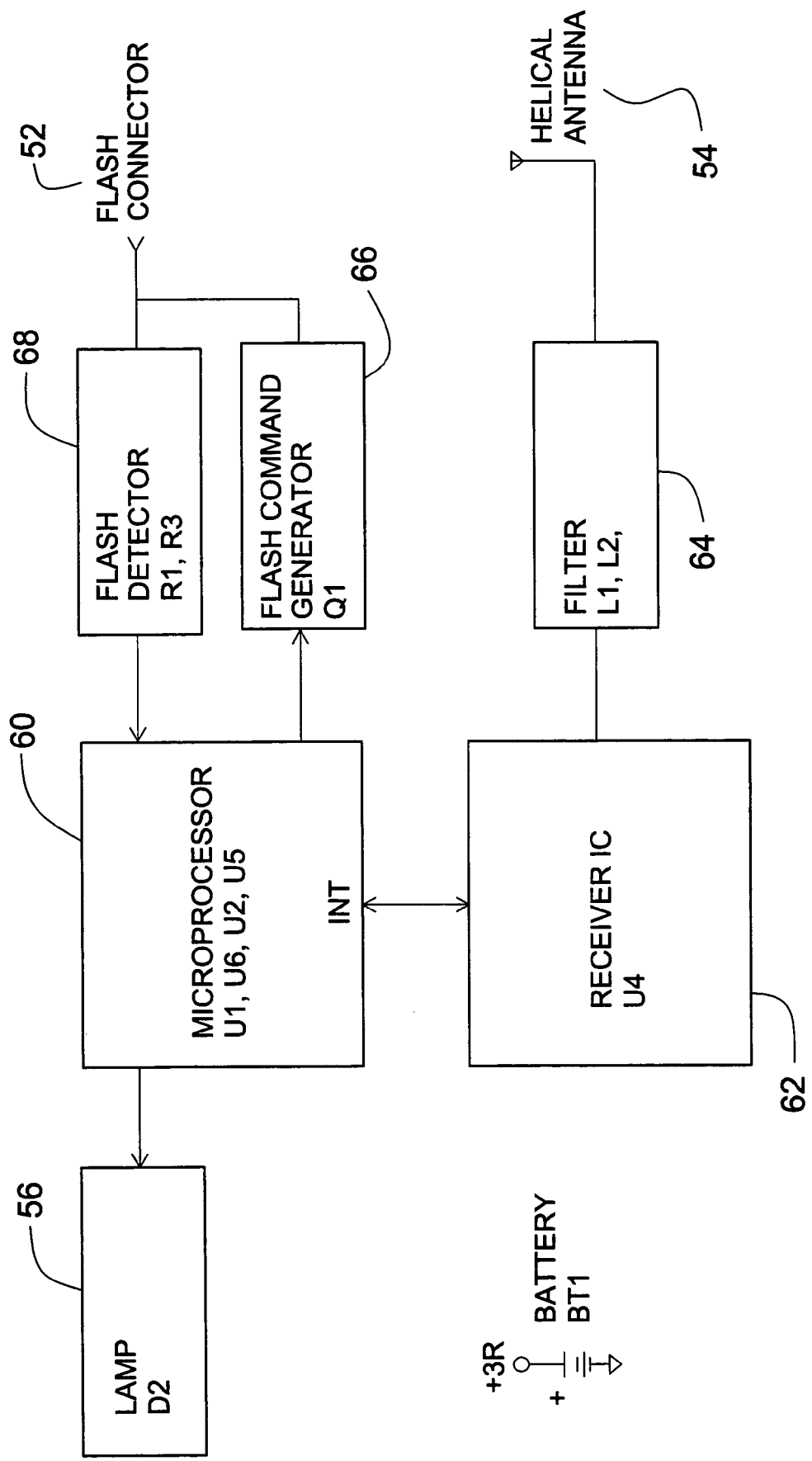
FIG. 6 is a block schematic diagram illustrating the component parts of the receiver unit of the present invention radio sync device for photographic equipment.
Figure 7:
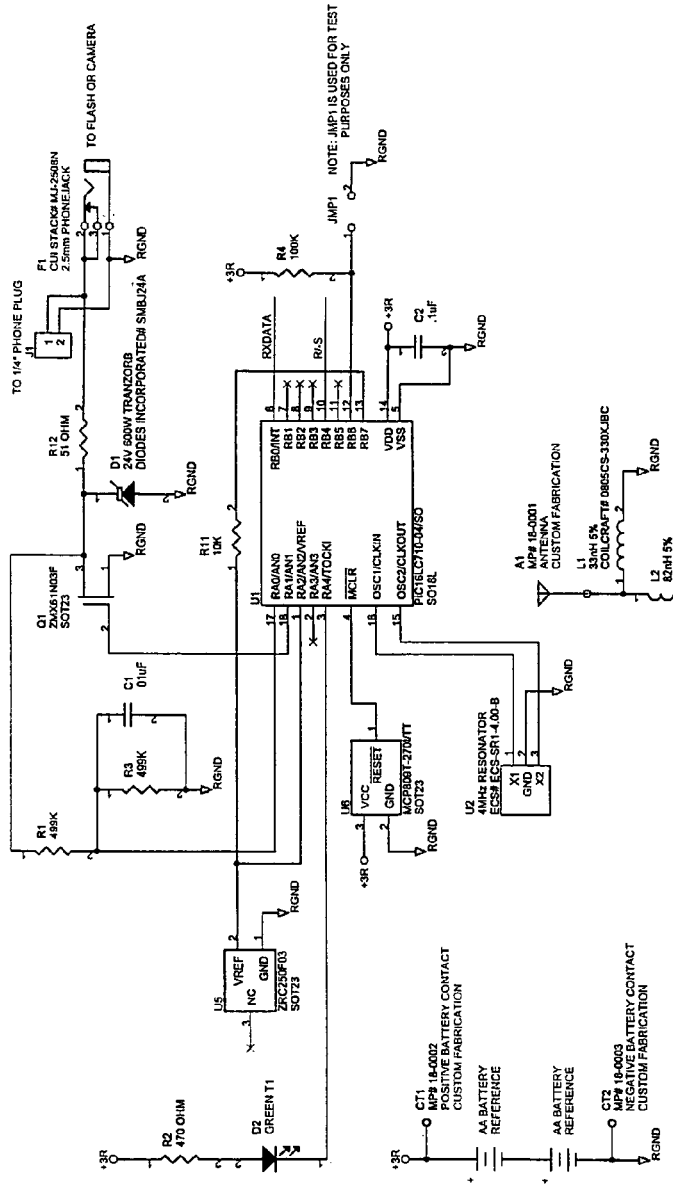
FIG. 7 is a detailed schematic diagram illustrating the circuitry of the internal electronics of the receiver unit of the present invention radio sync device for photographic equipment.
Figure 7:
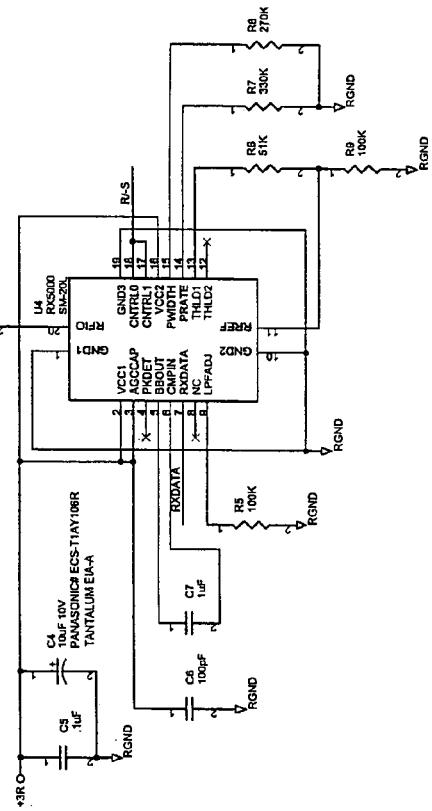

Referring to FIGS. 5, 6 and 7, the receiver 14 of the present invention radio sync for photographic equipment has a housing 50 for containing its internal electronics and battery, and a plug connector 52 for connection with a strobe lighting device (not shown).

The internal electronics of the receiver 14 includes a microprocessor 60 and an RF receiver 62. The RF transmitter 62 receives signal from a helical antenna 54 through a filter 64. The microprocessor 60 processes the signal and causes a flash command generator 66 to generate a flash command that is sent to the strobe via the flash connector 52. The status of the RX 14 may be indicated by an LED 56.

The electronic components of RX 14 are programmed to implement a power-sensing scheme such that both the microprocessor 60 and the RF receiver 62 of the RX 14 are normally in a low-power sleep mode. The microprocessor 60 waking up every 18 milliseconds or so to check the output connection for voltage. The checking of the output voltage takes just a few microseconds every 18 milliseconds, so almost no power is used in the idle state.

When the receiver 14 is plugged into a flash unit or camera remote trigger input, a voltage appears at the flash connector 52. If this voltage is detected by the microprocessor 60 through a flash detector 68, the microprocessor 60 powers up the receiver 14 and continues to check the output for voltage periodically, and if the voltage is present the receiver 14 remains to be powered up, ready to operate the flash in the event of a correct receiver signal. When the receiver 14 is commanded to operate the flash, the receiver output is pulled low by the microprocessor 60.

During the time the output is pulled low, the microprocessor 60 ignores the voltage at the flash connector 52 that tells it to stay on, because the microprocessor 60 knows it is pulling the output low itself. After the flash operation is complete, the microprocessor 60 again monitors the receiver output for the voltage-present state, and remains on if it is present. After a few hundred milliseconds of the output going into the no-voltage present state, the microprocessor 60 turns off the receiver 14 and it goes back into the low-power state.

In order to avoid the need of a change channel switch, a special change channel mode is programmed into the microprocessor 60. For the first 10 seconds after the output voltage goes high which causes the receiver 14 to be turned on, the receiver 14 will accept special channel-change transmissions from the transmitter 12. If a channel-change transmission is received by the receiver 14, the microprocessor 60 of the receiver 14 changes the code that it accepts to fire the strobe. The reception of the channel change code is acknowledged by flashing the LED 56 1 to 4 times, indication the current channel number.

In operation, a user uses the present invention radio sync system 10 by mounting the TX camera boot connector 22 on a camera's hotshoe, and plugging the flash connector 52 directly into a strobe's sync input (if no hotshoe is available, or the receiver's plug does not fit the strobe's sync input, an adapter may be used). The RX 14 senses automatically when it is plugged in and power is applied to the strobe, and wakes up from standby, signified by a blinking LED 56. The system is then ready.

Once the system is ready, the user can trigger the strobe (or other camera product) by either pressing the TX flash pushbutton connector 24 or the camera's shutter release. The TX 12 immediately transmits a signal to the RX 14, which triggers the strobe through its plug.

Another use for the present invention radio sync system 10 is to trigger a camera remotely. A user can plug the RX 14 into the camera's shutter release input using an adapter cable. Then the user triggers the camera by either pressing the TX flash pushbutton connector 24, or mounting the TX 12 on another camera and pressing the shutter release button of the other camera, thereby causing the TX 12 to transmit a signal to the RX 14 which in turn triggers the remote camera.

The present invention has many advantages. The main advantage is the low power consumption by the TX and RX units, which greatly reduces the size of the batteries needed and also extends the life of the batteries. This in turn makes it possible to reduce the size of the TX and RX. It also makes it possible to use smaller, lighter and less durable mounting hardware for mounting the TX and RX to the camera and strobe respectively.

Defined broadly, the present invention is a radio sync system to be used between local and remote photographic equipment, comprising: (a) a transmitter unit having means for connection with a local photographic equipment and a housing for containing its internal electronics including a microprocessor, an input signal detector, a radio frequency (RF) transmitter and a transmitter antenna; (b) a receiver unit having means for connection with a remote photographic equipment and a housing for containing its internal electronics including a microprocessor, a command signal generator, a radio frequency (RF) receiver and a receiver antenna; (c) the transmitter unit having a power-management means that keeps the transmitter unit in a low-power stand-by state, that powers up the transmitter unit when an input signal from the local photographic equipment is detected by the input signal detector for transmitting an RF signal to the receiver unit, and that returns the transmitter unit back into the low-power stand-by state within a predefined short period of time after transmitting the RF signal; and (d) the receiver unit having a power-sensing means that keeps the receiver unit in a low-power stand-by state when it is not connected to the remote photographic equipment or the remote photographic equipment is powered off, and that only powers up the receiver unit when it is connected to the remote photographic equipment and the remote photographic equipment is powered on such that when the receiver receives the RF signal, a command signal can be generated by the command generator and sent to the remote photographic equipment through the connector to operate the remote photographic equipment.

Defined alternatively, the present invention is a transmitter unit for radio synchronization of photographic equipment comprising power-management means for keeping the transmitter unit in a low-power stand-by state except when an RF signal needs to be transmitted, and returning the transmitter unit back into the low-power stand-by state within 1.5 milliseconds after transmitting the RF signal.

Also defined alternatively, the present invention is a receiver unit for radio synchronization of photographic equipment comprising power-sensing means for keeping the receiver unit in a low-power stand-by state when it is not connected to a remote photographic equipment or the remote photographic equipment is powered off but turning the receiver unit on when it is connected to a remote photographic equipment and the remote photographic equipment is powered on such that when an RF signal is received, the receiver unit can send a command signal to operate the remote photographic equipment.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A radio sync system to be used between local and remote photographic equipment, comprising:
   a. a transmitter unit having a camera boot connector for connection with a local photographic equipment and a housing for containing its internal electronics including a microprocessor, an input signal detector, a radio frequency (RF) transmitter and a transmitter antenna said transmitter unit further comprises means for visually indicating the status of said transmitter unit;
   b. a receiver unit having means for connection with a remote photographic equipment and a housing for containing its internal electronics including a microprocessor, a command signal generator, a radio frequency (RF) receiver and a receiver antenna;
   c. said transmitter unit having a power-management means that keeps said transmitter unit in a low-power stand-by state, that powers up said transmitter unit when an input signal from said local photographic equipment is detected by said input signal detector for transmitting an RF signal to said receiver unit, and that returns said transmitter unit back into said low-power stand-by state within a predefined short period of time after transmitting said RF signal, the microprocessor of the transmitter receives a signal from a camera boot detector and also from a flash pushbutton switch and a change channel switch pushbutton with the status of the transmitter being indicated by a light emitting diode; and
   d. said receiver unit having a power-sensing means that keeps said receiver unit in a low-power stand-by state when it is not connected to said remote photographic equipment or said remote photographic equipment is powered off, and that only powers up said receiver unit when it is connected to said remote photographic equipment and said remote photographic equipment is powered on such that when said receiver unit receives said RF signal, a command signal can be generated by a command signal generator and sent to said remote photographic equipment through said connector to operate said remote photographic equipment, the microprocessor of the receiver processes a signal and camera flash command generator to generate a flash command that is sent to a strobe through a flash connector including light means to indicate the status of the receiver, the microprocessor of the receiver waking up every few milliseconds to check an output connection for voltage; and e. means for detecting whether or not the receiver is connected to remote photographic equipment;

f. the receiver including a voltage detector detected by the microprocessor of the receiver to power up the receiver and means to continue to check for output voltage and if output voltage is present, the receiver is powered up and ready to operate a flash in the event of a correct signal to the receiver and when the receiver is commanded to operate the flash, the receiver unit output is pulled low by the microprocessor of the receiver, and means that causes the microprocessor of the receiver to ignore the voltage at the flash connector and tell it to stay on in the event the output is pulled low because the microprocessor of the receiver knows it is pulling the output low itself;

g. means to enable the microprocessor of the receiver to monitor the receiver output for the voltage present state and remain on if it is present and turning off the system if no voltage is detected and going back to a lower power state; and h. a channel change mode programmed into the microprocessor of the receiver which for a short period of time after the output voltage goes high causes the receiver to be turned on, the receiver having means to accept signal channel change transmission from the transmitter and if a channel change transmission is received by the receiver, the microprocessor of the receiver changes the code that it accepts to fire the strobe, with the reception of the channel change code being acknowledged by flashing lights indicating a current channel number.

2. The radio sync system in accordance with claim 1, wherein said means for connection of said receiver unit comprises a plug.

3. The radio sync system in accordance with claim 1, wherein said predefined short period of time is 1.5 milliseconds.

4. The radio sync system in accordance with claim 1, wherein said transmitter unit further comprises means for changing RF transmission channel.

5. The radio sync system in accordance with claim 1, wherein said transmitter unit further comprises means for manually powering up said transmitter unit to transmit an RF signal to said receiver for operating said remote photographic equipment.

6. The radio sync system in accordance with claim 1, wherein said transmitter unit further comprises a filter means connected between said RF transmitter and said transmitter antenna.

7. The radio sync system in accordance with claim 1, wherein said transmitter unit further comprises a battery power source.

8. The radio sync system in accordance with claim 1, wherein said receiver unit further comprises means for visually indicating the status of said receiver unit.

9. The radio sync system in accordance with claim 1, wherein said receiver unit further comprises a filter connected between said RF receiver and said receiver antenna.

10. The radio sync system in accordance with claim 1, wherein said receiver unit further comprises a battery power source.

* * * * *